United States Patent [19]
Ohkubo

[11] Patent Number: 5,713,070
[45] Date of Patent: Jan. 27, 1998

[54] IMAGE FORMING APPARATUS WHICH PREVENTS LOSS OF THE ORIGINAL IMAGE

[75] Inventor: Hiroshi Ohkubo, Ebina, Japan

[73] Assignee: Fuji Xerox Co., Ltd., Tokyo, Japan

[21] Appl. No.: 629,085

[22] Filed: Apr. 8, 1996

[30] Foreign Application Priority Data

Apr. 14, 1995 [JP] Japan ................................. 7-113631
Apr. 2, 1996 [JP] Japan ................................. 8-106278

[51] Int. Cl.$^6$ ..................................... G03G 15/00
[52] U.S. Cl. ........................................ 399/363; 358/401
[58] Field of Search ........................... 399/363, 376, 399/394; 358/296, 401, 444, 449, 451, 488; 395/115, 116, 117; 347/153

[56] References Cited

U.S. PATENT DOCUMENTS 5,001,574  3/1991  Shimuzu et al. .................. 358/448

FOREIGN PATENT DOCUMENTS

57-70563  5/1982  Japan .

*Primary Examiner*—Joan H. Pendegrass
*Attorney, Agent, or Firm*—Oliff & Berridge, P.L.C.

[57] ABSTRACT

An image forming apparatus having an overall original-copy recording function for effecting image recording automatically in one simple operation without loss of any part of the overall original image. A scanner is used to scan an original copy to detect the original-copy size. In the absence of an original-copy skew, the original-copy size is assumed to be equal in size to the original image, whereas in the presence of the original-copy skew, the size of a square internally touched by the skewed original copy is made the original image. Selection is made of copying paper whose size is greater than a combination of the detected original-copy size and a copying paper skew and of a memory corresponding to the selected copying paper size, so that the original image that has been read is stored. The original image is formed on the selected copying paper before being output. Through the above process, loss of any part of the image is prevented by providing a margin greater than the copying paper skew quantity between the copying paper edge portion and the original image.

5 Claims, 11 Drawing Sheets

IMAGE FORMING APPARATUS WHICH PREVENTS LOSS OF THE ORIGINAL IMAGE

BACKGROUND OF THE INVENTION

1. Field of the Invention

The present invention relates to an image forming apparatus having an overall original-copy recording function for recording an original image on copying paper at equi-magnification. More particularly, the present invention relates to an image forming apparatus fit for use in recording an image on transfer paper automatically in one simple operation without loss of any part of the original image.

2. Description of the Related Art

When an original image is recorded on copying paper, the original image recorded on the selected copying paper may wane if an original copy and/or the copying paper is skewed. In order to cope with such a copying paper skew, the skew has been corrected by placing registration rolls or a registration gate on this side of a transfer position to stop the copying paper once. The system proposed in Japanese Patent Unexamined Publication No. Sho 57-70563, for example, is such that a curved guide chute is installed at the preceding stage of registration rolls and registration pinch rolls. Further, an elastic material capable of elastic deformation in the direction of the nip between the registration rolls and the registration pinch rolls is provided at the leading end of the outer chute forming the guide chute. The copying paper fed from a paper feeding unit is guided by the guide chute before being driven into the nip. At this time, the copying paper is caused to buckle outward in the curved portion of the guide chute. The elastic material is pressed by the buckling of the copying paper and the counterforce acts on the nip via the lead edge of the copying paper, so that the copying paper skew is corrected. In the present circumstances, however, it is not yet possible to correct the copying paper skew completely even in the aforesaid system due to, for example, variations in the parts-assembling precision. Moreover, the same problem is also posed in a case where an automatic paper feeding unit is employed against the original-copy skew.

There is a conventional image forming apparatus having a "smallish function" so to speak according to which an original image is prevented from waning because of a copying paper skew by decreasing magnification and placing the original image in the central portion of copying paper. However, the image recorded on the copying paper naturally becomes smaller.

Recently, it has been devised to make a facsimile entirely equal in size to an original image by recording the original image at equi-magnification on copying paper and cutting the copying paper with only the original image left thereon. In order to obtain an output free from the wane of the image at equi-magnification, there has been employed a method of setting an original-copy-frame canceling quantity to zero, selecting copying paper whose size is greater than "original-copy size+a paper-edge canceling quantity" or otherwise designating the movement of the center of the paper. However, the original-copy-frame canceling quantity intended for preventing platen-back read-in in a case where the original-copy skew exists is hard to understand and so is the paper-edge canceling quantity for preventing toner from spilling out of the copying paper in the presence of the copying paper skew; therefore, the operation based on such a method has been made difficult to understand.

SUMMARY OF THE INVENTION

An object of the present invention is to provide an image forming apparatus having an overall original-copy recording function for effecting image recording automatically in one simple operation without loss of any part of the overall original image.

In order to accomplish the above object, an image forming apparatus according to the invention comprises original-copy reading means for producing image data corresponding to an original image, original-copy detecting means for detecting original-copy size according to image data, copying paper selecting means for selecting transfer paper whose size is greater than the original-copy size on the basis of the original-copy size detected by the original-copy detecting means and a copying paper skew quantity, copying paper supply means for supplying the copying paper selected by the copying paper selecting means, and image-write-position control means for controlling image-write timing in agreement with the copying paper fed from the copying paper supply means.

With the aforesaid arrangement, the original-copy size is detected from the original image read by a scanner and a selection is made of copying paper whose size is greater than what includes the copying paper skew quantity. The original image is written to an image write position corresponding to the selected copying paper and an image is formed on the copying paper supplied, whereby image loss is prevented from being caused thereto.

An image forming apparatus according to the invention further comprises means for designating the operation of recording an overall original-copy.

With the aforesaid arrangement, multifarious needs are met and expediency is improved since the operation of recording an overall original-copy can be effected in agreement with user's selection.

An image forming apparatus according to the invention may be arranged so that the original-copy size is defined as the size of a rectangular which is internally touched by the skewed original copy in a case where the original-copy skew exists.

With the aforesaid arrangement, the operation of recording an overall original-copy is made possible even in the automatic reading system by causing the original copy to be conveyed to an image read position since the original-copy size is what includes the original-copy skew in a case where the original-copy skew exists.

An image forming apparatus according to the invention may be arranged so that the image-write position control means causes an image to be written from a position on the inner side of the leading end portion of the copying paper fed from the copying paper supply means by at least what is equivalent to the copying paper skew quantity.

With the aforesaid arrangement, an image can be recorded on selected copying paper with a sufficient space from its edge, the size of the selected copying paper being a combination of the detected original-copy size and the copying paper skew quantity, by reading the original image into a memory and writing the image by shifting the image write position inward by the copying paper skew quantity.

An image forming apparatus according to the invention, further comprises a memory for storing image data, means for securing a free storage capacity in the memory on the basis of the original-copy size detected by the original-copy detecting means and the size of the transfer paper selected by the copying paper selecting means, and control means for controlling the preparation of an address for use in writing the image data to the memory in consideration of the copying paper skew quantity, and the operation of writing the image data to the memory thus secured.

With the aforesaid arrangement, the free storage capacity is secured in the memory in consideration of the original-copy skew and/or the copying paper skew. The image data can be stored in the memory thus secured by shifting an image-data write position by a quantity equivalent to the copying paper skew quantity or otherwise the memory thus secured in proportion to the original-copy size in consideration of the original-copy skew quantity. The timing at which the image data is written to laser write means under the former method can be controlled, irrespective of the presence or absence of the copying paper skew. Under the latter method, on the other hand, control is exerted in such a way that the timing at which the image data is written to the laser write means is shifted by what is equivalent to the copying paper skew quantity.

According to the present invention, it is possible for the user to record the original image without loss of any part of the overall original image without consciousness of the paper-edge canceling quantity as well as the original-copy-frame canceling quantity. Moreover, an original copy entirely the same as what is free from image loss can be recorded by cutting off the margin of the record taken at equi-magnification while the aforesaid function is used.

The above and other objects and features of the present invention will be more apparent from the following description taken in conjunction with the accompanying drawing.

DETAILED DESCRIPTION OF THE PREFERRED EMBODIMENTS

Figure 1:
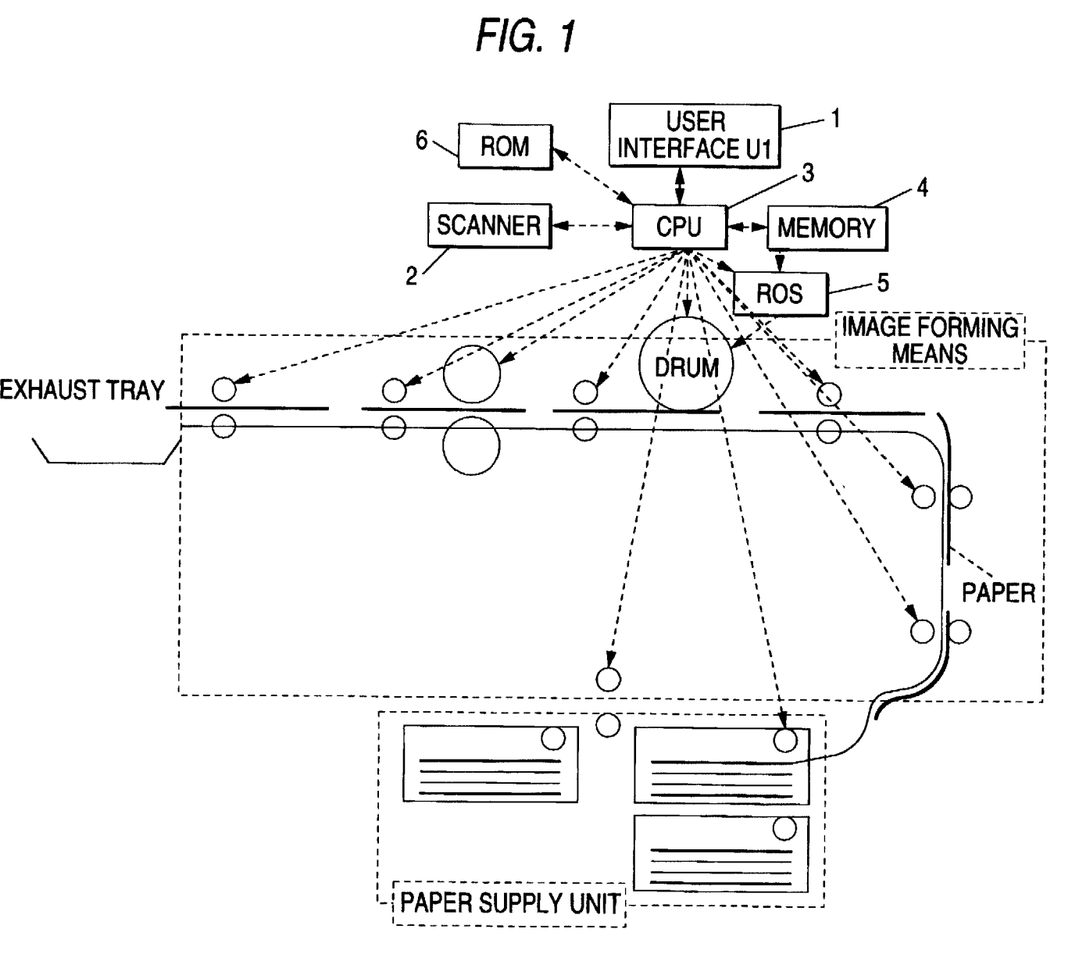
FIG. 1 is an elemental block diagram showing an electric control system in an image forming apparatus according to the present invention.

An embodiment of the present invention will be described by reference to the accompanying drawings. FIG. 1 is an elemental block diagram of an electric control system in an image forming apparatus according to the present invention.

The image forming apparatus has an image forming means for recording an original image that has been read on copying paper. In the image forming means, the copying paper fed from a paper supply unit undergoes an image forming process including writing the original image that has been read out to a drum and developing the image. In the transfer unit of the image forming means, further, the original image thus developed is transferred to the copying paper fed from the paper supply unit in agreement with timing at which the image forming process is performed and the image on transfer paper is fixed in the fixing unit thereof before the transfer paper is discharged into a feeder output tray.

The electric control system for materializing the function of the image forming means comprises a user interface (UI) 1 having a display and a control panel for allowing a user to select desired functions and designate the conditions under which the functions are performed; a scanner 2 for reading an image on a original copy mounted on a platen glass placed on the surface of the apparatus body; a CPU (Central Processing Unit) 3 for exerting various kinds of control including control over the drum (charging, development, transfer, charge elimination, cleaning and so on), fixing control, paper conveyance control and the like, and for editing/processing the original image read by the scanner 2 on the basis of the conditions designated by the user interface (UI) 1 under which the image recording is carried out; a memory 4 for storing the original image thus processed by the CPU 3; a laser write unit (ROS) 5 for reading the original image from the memory under instructions concerning the writing operation from the CPU 3 so as to write the original image to the drum; and a ROM 6 which is stored with programs and data necessary for image forming control. In the case of a full color image forming apparatus, the image forming means is arranged so that primary colors Y (yellow), M (magenta), C (cyan) and K (black or indian ink) are used for developing the original image.

A description will subsequently be given of the overall original-copy recording function of the image forming apparatus according to the present invention. The overall original-copy recording function is to record an original image on the selected copying paper at equi-magnification, that is, without editing the original image at reduced magnification and without loss of any part of the original image. Moreover, the image recording generally refers to copies in copying machines, prints in printers and the like. In order to materialize the overall original-copy recording function, the image forming apparatus has a memory for storing original images. With respect to the user interface (UI) 1, it is formed with a touch switch incorporated in a monitor of FIG. 9 and equipped with function buttons so that the user may be able to carry out the overall original-copy recording. When the overall original-copy recording function is selected, the CPU 3 reads a program for performing the functions concerned from the ROM and executes the program.

Figure 2:
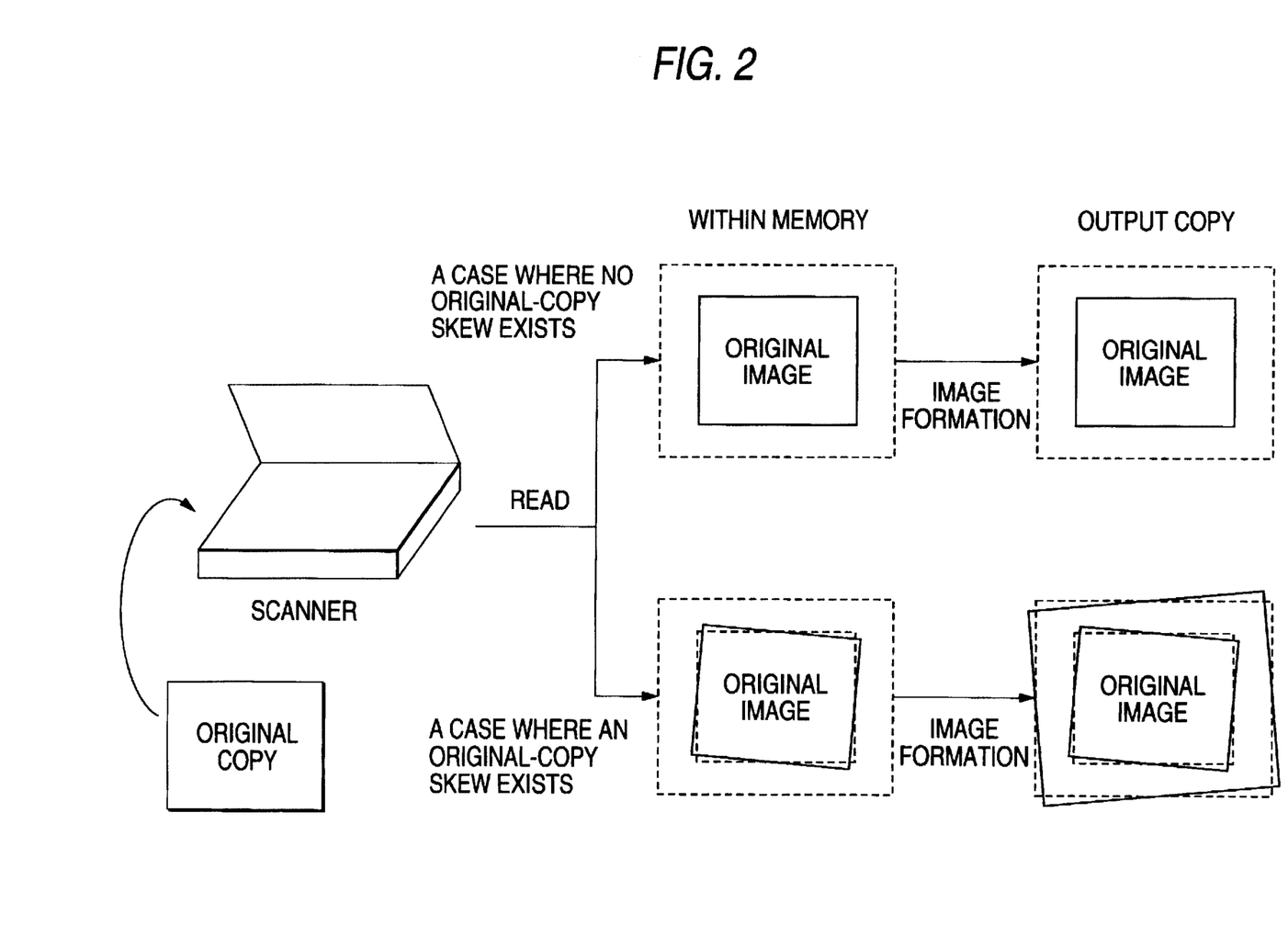
FIG. 2 is a diagram explanatorily showing a memory operating procedure in an overall original-copy recording function.

FIG. 2 is a diagram explanatory of a memory operating procedure for recording the overall original-copy directly on copying paper. First, the overall original-copy recording function buttons of the user interface (UI) 1 are pressed to start the apparatus and the original copy is scanned by the scanner so as to detect the original-copy size. When the original-copy size is detected, it remains equal to the actual size of the original-copy in the absence of an original-copy skew. However, the original-copy size is equalized with the size of a rectangular which is internally touched by the skewed original copy in a case where the original-copy skew exists. Selection is made of copying paper whose size is greater than what results from adding a copying paper skew quantity to the detected original-copy size. Further, a memory corresponding to the size of the selected copying paper is selected and image data corresponding to the original image that has been read out. Then an image is formed according to the image data read from the memory by controlling image write timing and the original image is recorded on the selected copying paper as an output copy. Through the process like this, a margin greater than the copying paper skew quantity is provided between the copying paper edge portion (shown by a solid line in FIG. 2) and the original image, so that the image is prevented from waning.

In this case, the copying paper skew quantity varies with the specification of the copying paper conveying system of the image forming apparatus and the copying paper size. Therefore, the copying paper skew quantity should preferably be set on a copying paper size basis in order to attain an optimum overall original-copy recording function with respect to every copying paper size. However, the copying paper skew quantity is normally set at a predetermined value because a sufficiently satisfactory copy output is available even though it is set at such a predetermined value, irrespective of copying paper size.

Figure 3:
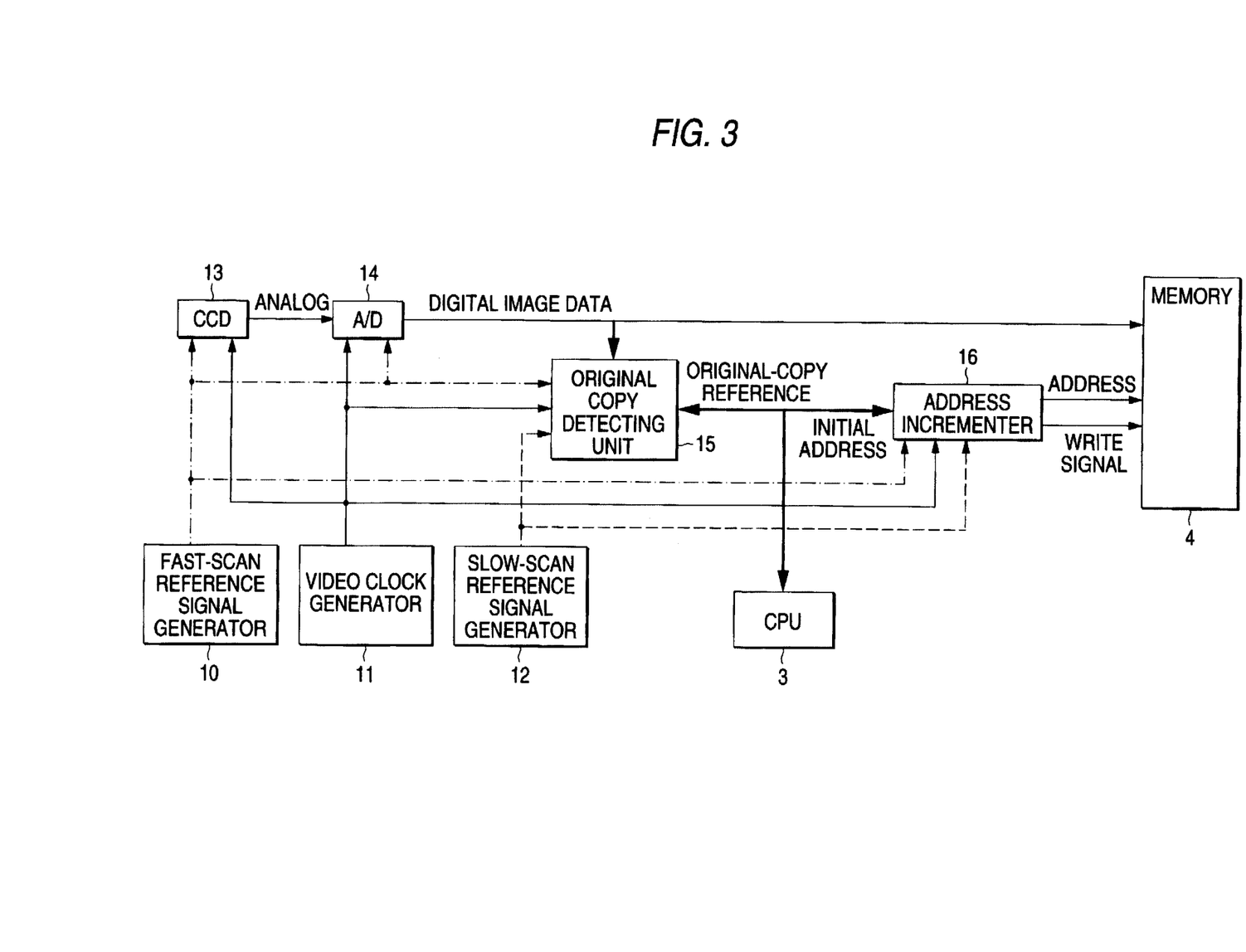
FIG. 3 is a block diagram showing the hardware configuration of a read system.
Figure 4:
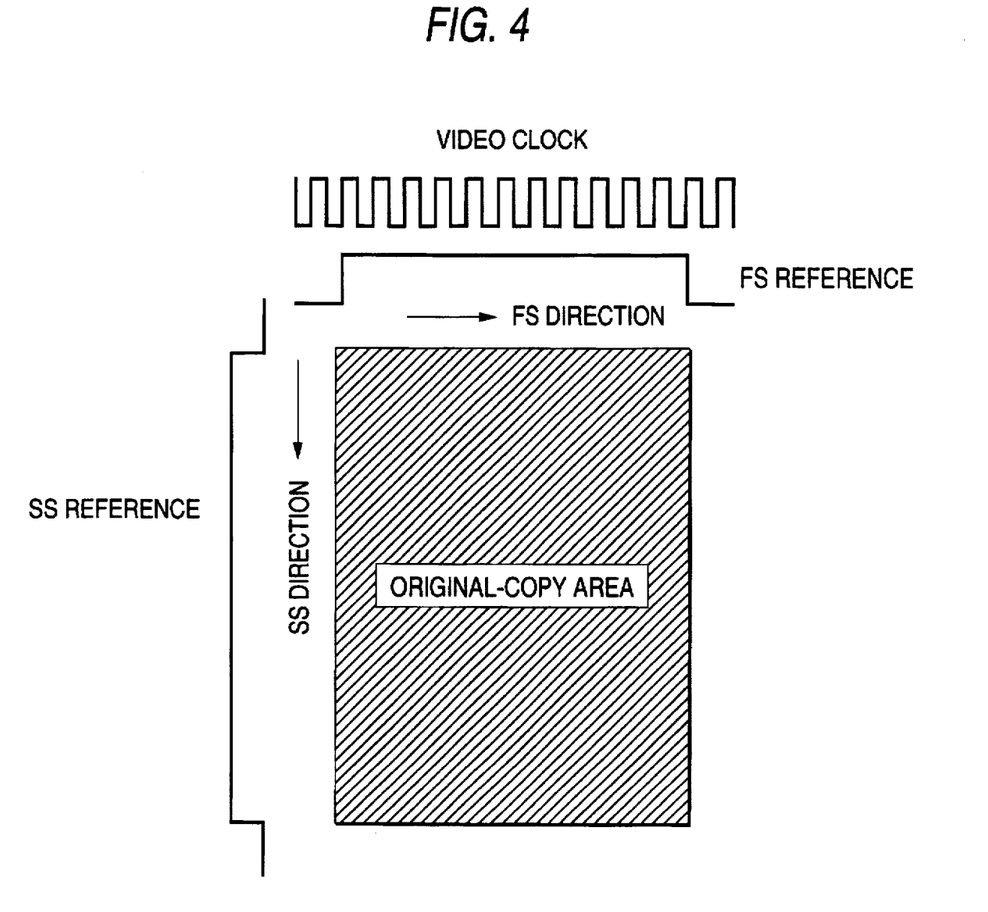
FIG. 4 is a diagram explanatorily showing a signal to be generated by a reference signal generating unit.

FIG. 3 illustrates the hardware configuration of a read system. A reference signal generating unit for generating a reference signal for performing an original-copy read process is made up of a fast-scan reference signal generator 10, a slow-scan reference signal generator 11 and a video clock signal generator 12. The signals generated by the respective reference signal generators will subsequently be described by reference to FIG. 4. The fast-scan reference signal generator 10 generates a fast-scan reference signal (FS reference signal) for reading the original copy as a line in the direction of FS. The slow-scan reference signal generator 11 generates a slow-scan reference signal (SS reference signal) for indicating a read range in the direction of SS. The video clock signal generator 12 generates a video clock signal for reading a line in the direction of FS, pixel by pixel.

When the operation of reading the original copy is performed, a original-copy read unit (CCD) 13 reads a line in the FS direction of an original-copy area, pixel by pixel, with the video clock signal from the slow-scan reference signal generator 11 as a reference on receiving the FS reference signal from the fast-scan reference signal generator 10 and outputs an analog signal. An analog/digital signal converting unit (A/D) 14 converts the analog signal from the original-copy read unit (CCD) 13 into digital image data by synchronizing the FS reference signal and the video clock signal.

An original-copy detecting unit 15 retrieves the digital image data from the analog/digital signal converting unit (A/D) 14 according to the FS reference signal, the SS reference signal and the video clock signal and finds the original-copy size by computing the digital image data for comparison with an original-copy reference (threshold value) set by the CPU 3.

The CPU 3 sets the threshold value as an original-copy reference in the original-copy detecting unit 15. Further, the CPU 3 makes the laser write unit (ROS) 5 perform the write operation directly under write timing control without storing the image data in the memory, stores the image data in the memory and assumes the image write timing control according to the image data. The CPU 3 also secures a free memory capacity in the memory 4 out of the original-copy skew quantity based on the original-copy size detected by the original-copy detecting unit 15 and the copying paper skew quantity of the copying paper size selected in the mode of writing the image data to the memory 4 and besides sets an initial address indicative of a write start position in an address incrementer when the image data is stored in the memory. The address incrementer 16 creates an address at which the image data is written to the memory out of the FS reference signal, the SS reference signal and the video clock signal.

The memory 4 stores the image data from the analog/digital signal converting unit (A/D) 14 at the address provided according to a write signal from the address incrementer 16.

Figure 5:
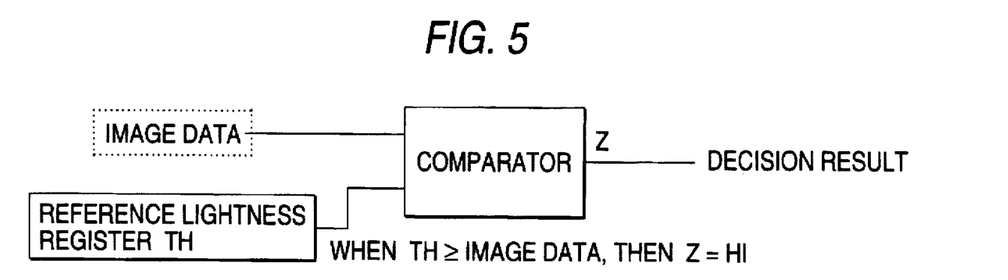
FIG. 5 is a diagram explanatorily showing decision-making about an original copy.

A detailed description will be given of the original-copy detecting unit. The original-copy detecting function serves to detect the original-copy from a difference in lightness between the original-copy and a platen cover at a prescanning time using a platen cover offering a color density as high as what can readily be distinguishable from the original-copy. A comparator of FIG. 5 is used to decide whether there exists an original-copy. The comparator compares the image data with a reference value TH set in a reference lightness register TH and outputs Z=Hi (high) as a result of decision when TH≧image data.

Figure 7:
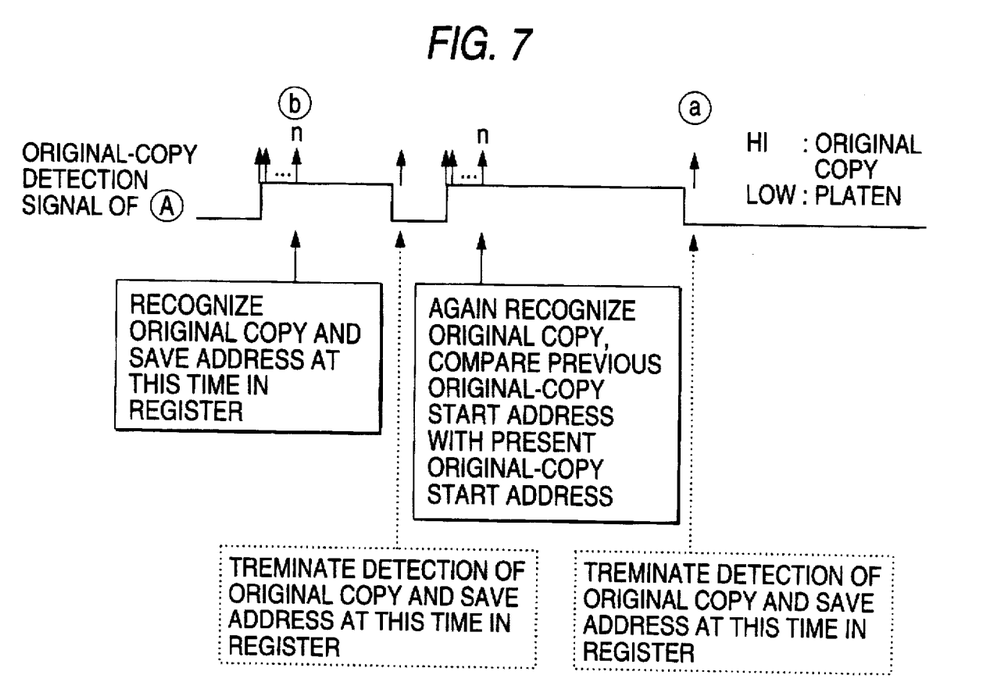
FIG. 7 is a time chart showing original-copy edge detection in the direction of FS.

When the original-copy is detected, the minimum original-copy edge and the maximum original-copy edge in the direction of FS are detected according to the image data. For example, a filter function in the direction of FS serves to recognize the original-copy for the first time when an original-copy signal is received a predetermined number of times. FIG. 7 is a time chart showing original-copy edge detection in the direction of FS.

Figure 6:
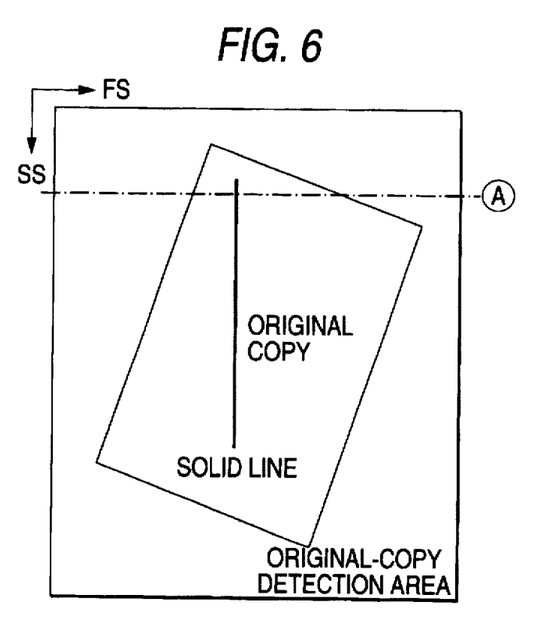
FIG. 6 is a diagram explanatorily showing original copy detection.

From the standpoint of a line "A" in FIG. 6, an original-copy is judged to be what is defined by a solid line of FIG. 7. In this case, it is assumed that black lines are drawn on the original-copy in the direction of SS. The original-copy is recognized from an original-copy detection signal "A" by means of a number of times the set original-copy signal is input.

As shown in FIG. 7, the original-copy detection signal is assumed to be Hi when an original-copy is found, whereas it is assumed Low (low) when the platen is present. When the original-copy detection signal is input "n" times first (point "b"), an original-copy is recognized and an address at this time is saved and this address is used as the minimum original-copy edge of the line "A". An address is saved in the register when the original-copy detection signal is changed by the platen to Low and this address is used as the maximum original-copy edge of the line A. In the case of a line "A" according to this embodiment of the invention, the point "b" makes an original-copy start address of the line, whereas a point "c" makes an original-copy termination address thereof.

The original-copy start address of the preceding line is compared with that of the present line each time the detection of the original-copy start/termination points of each line is terminated and a smaller one is written to the register. This process is repeated, so that the minimum original-copy edge is detected. While those points remain undetected, a maximum value is output. Similarly, the original-copy termination address of the preceding line and the original-copy termination address of the present line are compared and a larger one is written to the register. This process is also repeated, so that the maximum original-copy edge in the direction of FS is detected. Incidentally, a minimum value is output when such detection remains unfulfilled.

Figure 8:
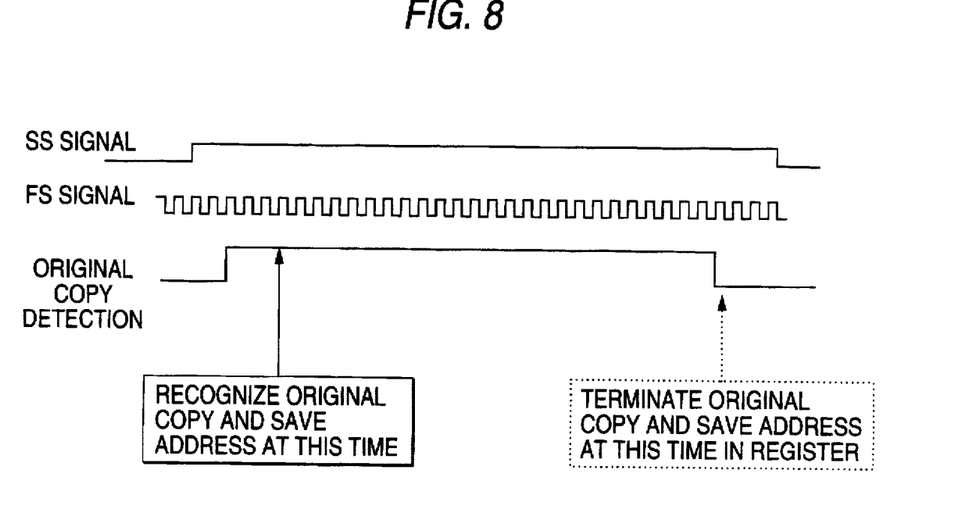
FIG. 8 is a time chart showing original-copy edge detection in the direction of SS.

Subsequently, a description will be given of the detection of the minimum and maximum original-copy edges in the direction of SS. The filter in the direction of SS determined the presence of an original-copy only when the original-copy detection signal is input a predetermined number of times equivalent to a predetermined number "n" of lines. FIG. 8 is a time chart showing original-copy edge detection in the direction of SS.

The detection of the minimum original-copy edge in the direction of SS causes an address resulting from inputting the original-copy detection signal only the predetermined number of times equivalent to the predetermined number "n" of lines for the first time to be saved in the register as the minimum edge in the direction of SS. Moreover, the detection of the maximum original-copy edge in the direction of SS causes an address of a line which finally fails to satisfy the set conditions to be saved in the register as the maximum edge in the direction of SS after the original-copy detection signal is continuously input only the predetermined number of times equivalent to the predetermined number of lines. Incidentally, a minimum value is output when such detection remains unfulfilled.

A description will subsequently be given of a process of selecting a memory corresponding to the copying paper, and a write process.

When the original-copy detecting unit detects an original-copy size, the CPU 3 seeks a required memory capacity from the copying paper size and secures a free area equivalent to the memory capacity thus obtained in the memory. The CPU 3 sets the leading address of the free memory in the address incrementer, places the address incrementer in a write mode and then has the scan operation performed. While incrementing the address per pixel, the address incrementer writes image data to the memory.

Figure 9:
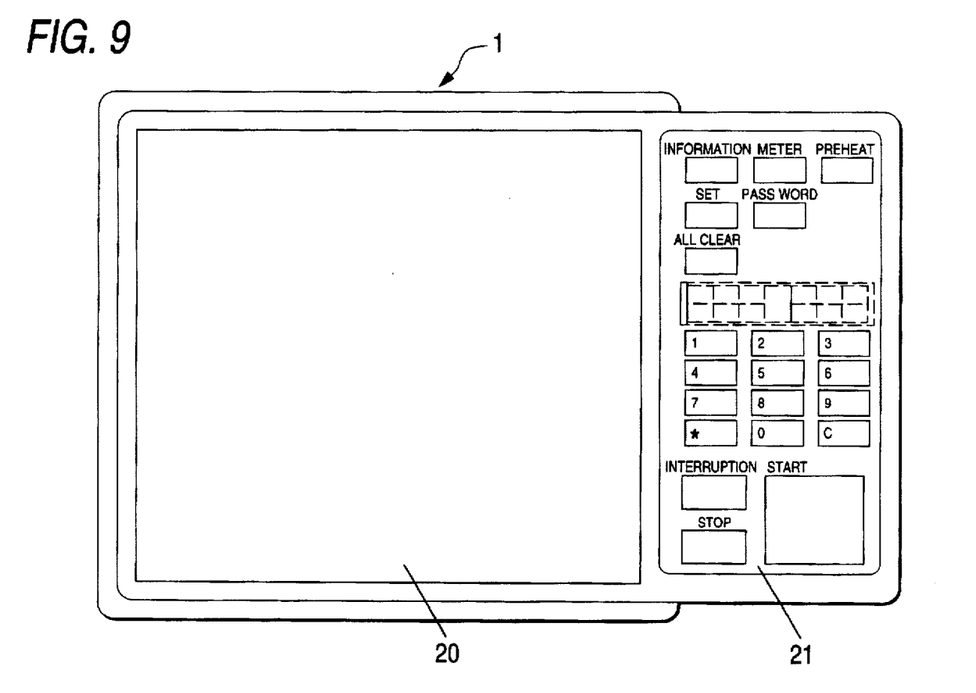
FIG. 9 is a block diagram showing an example of a UI unit.
Figure 10:
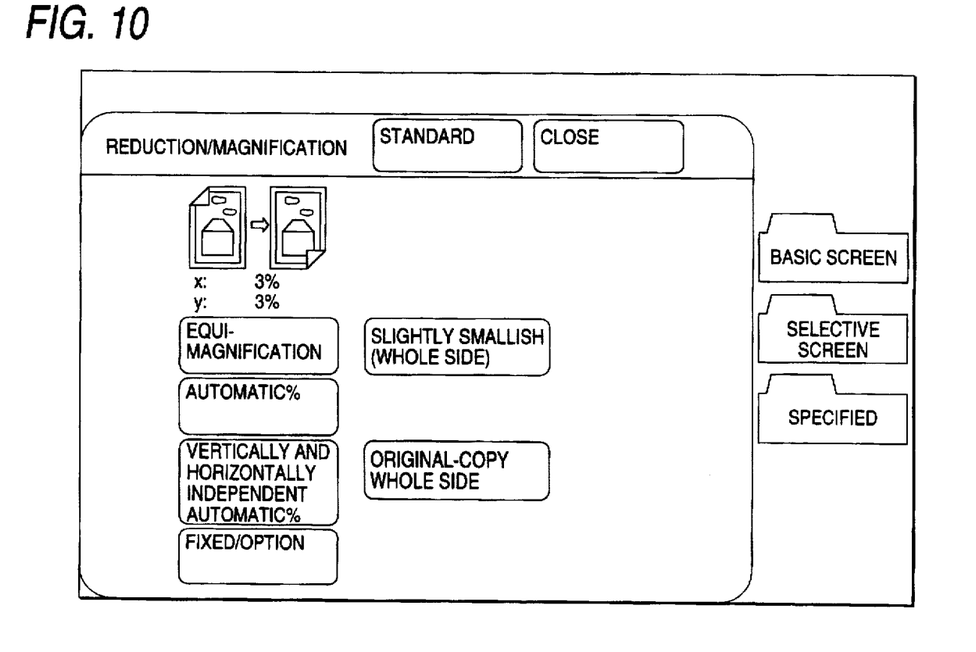
FIG. 10 is a block diagram showing an example of an LCD display screen of the UI unit.

The user interface (UI) 1 will subsequently be described. FIG. 9 is a block diagram showing an exemplary organization of a UI unit having a monitor screen. The user interface (UI) 1 has a display 20 for use in displaying various messages on a LCD as a display means, the display 20 having a soft button displayed on the LCD by which a touch panel (not shown) is detected when the button is pressed, and a hard button 21 for setting not only instructions for making a recording but also jobs. Herein, a description will be given of an operating screen for carrying out the overall original-copy recording according to the present invention. FIG. 10 is a block diagram showing an example of an LCD display screen. This example refers to a display screen at the time reduction/magnification buttons are pressed from a basic screen. On the display screen are selective buttons for implementing reduced/magnified recording including: an equi-magnification button for directly recording an original image that has been read, regardless of copying paper size; an automatic % button for vertically and horizontally making equi-reduction/equi-magnification in proportion to the size of an original image that has been read and recording the original image on copying paper of specified size; a fixed/optional button for recording an original image at a preset fixed/optional reduction/magnification %; a "slightly smallish (whole side)" button for reducing an original image that has been read and recording the original image on copying paper of selected size: and an overall original-copy button for directly recording an original image on copying paper of selected size without editing the original image for reduction or the like and without loss of any part of the original image.

When the overall original-copy recording is desired to be executed, the reduction/magnification button is pressed from the basic screen to display a selective screen of FIG. 10. Then, the overall original-copy button is pressed from the selective screen and then a start button is pressed to start the operation.

Figure 11:
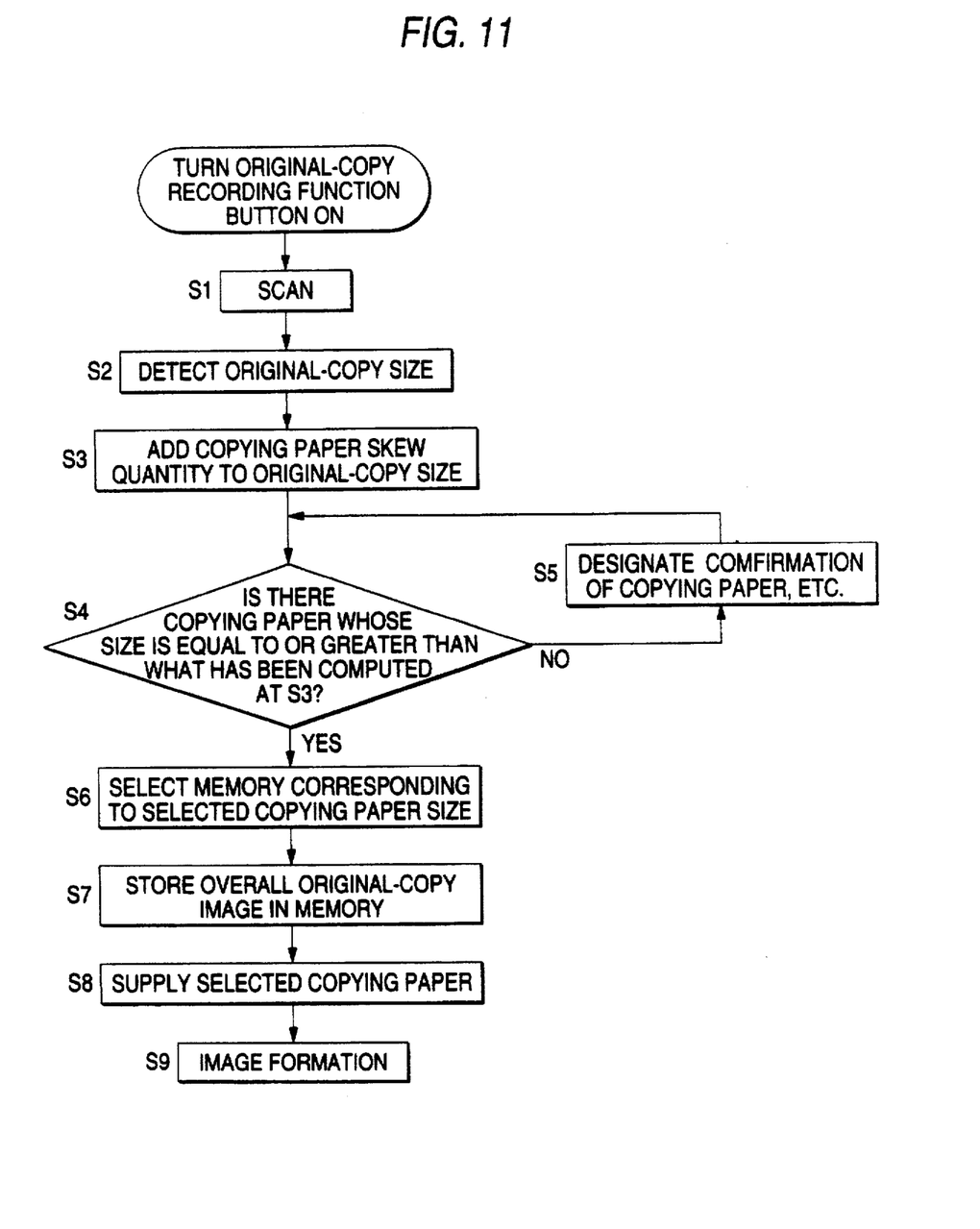
FIG. 11 is a flowchart showing an overall original-copy recording process.

Subsequently, the function of the apparatus according to this embodiment of the invention will be described. FIG. 11 is a flowchart showing an overall original-copy recording process. When the operation of the image forming apparatus is started by pressing the overall original-copy recording function button of the user interface (UI) 1, the scanner is made to scan an original copy (S1) and the original-copy size is detected (S2). A copying paper skew quantity (constant value; fixed) is added to the original-copy size detected (S3). A decision is made on whether or not there is copying paper whose size is greater than what has been computed at Step S3 (S4). In the absence of applicable copying paper, the confirmation of copying paper and the like are designated (S5) and Step S4 is followed again. In the presence of such applicable copying paper or in a case where applicable copying paper is supplemented in accordance with the designation of S5, on the other hand, selection is made of the copying paper involved and a memory corresponding to the copying paper size and an overall original image is stored in the memory from the scanner in such a way as to conform the center of the memory to that of the original image. Further, a white paper image is written to a portion other than the original image on the memory (S7). Then the selected copying paper is supplied from the paper supply unit (paper supply means) (S8) and the paper supply means is caused to form the overall image data in the memory on the whole side of the copying paper (S9).

Another embodiment of the present invention will subsequently be described. According to this embodiment of the invention, the image write position equivalent to the copying paper skew quantity is shifted inward with respect to the detected original-copy size.

Figure 15:
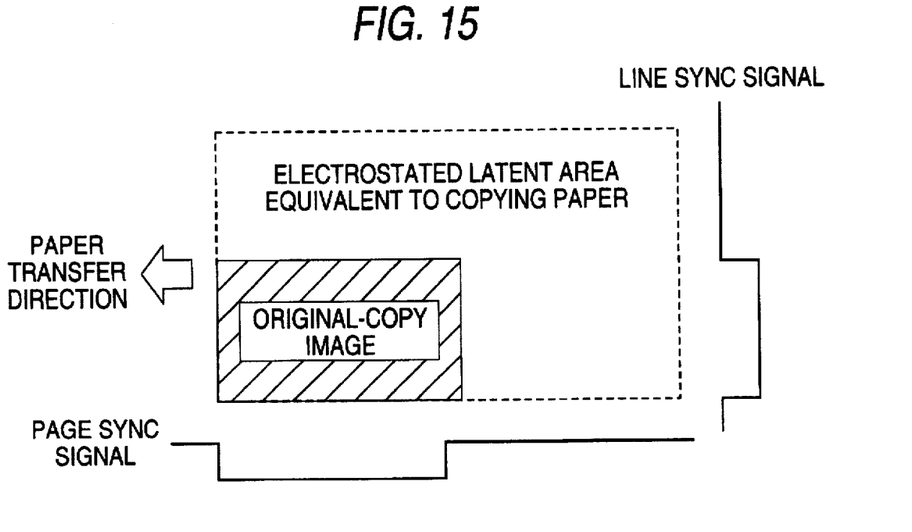
FIG. 15 is a diagram explanatorily showing the relationship between an original image and an image write position.

An image forming apparatus for forming an electrostatic latent image on a photosensitive drum by subjecting data in the memory to laser exposure via the ROS employs a PAGE SYNC and a LINE SYNC signal as those for controlling an exposure range in which the electrostatic latent image is formed on the photosensitive drum. As shown in FIG. 15, the LINE SYNC signal indicates the range in the direction of FS. With image data amounting to one line and the LINE SYNC signal, a LD driving signal of one line is output so as to drive a laser emission unit LDD. On the other hand, the PAGE SYNC signal indicates the range in the direction of SS. While the PAGE SYNC signal is active, an LD signal is output and the laser emission unit LDD is driven to light.

Figure 12:
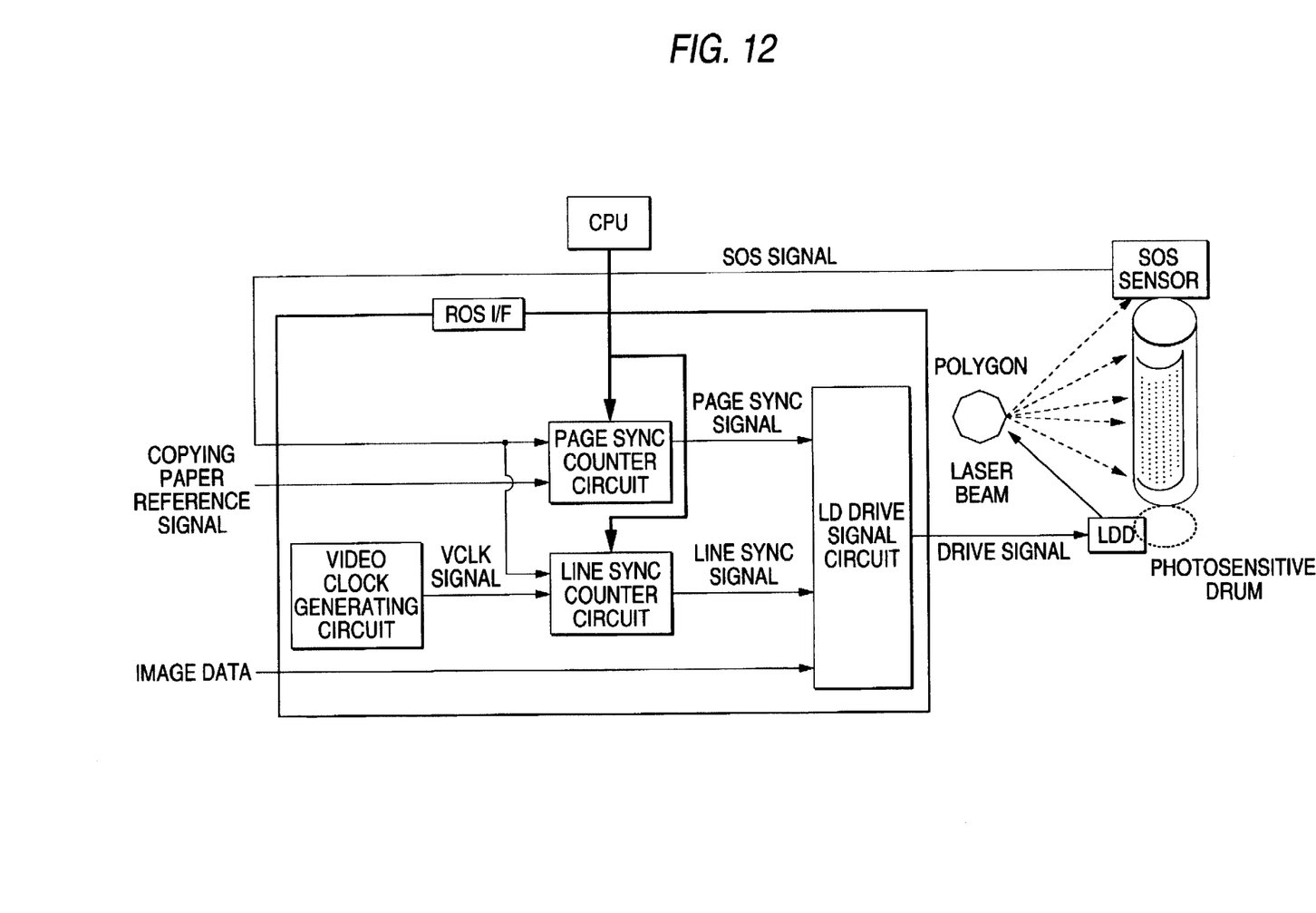
FIG. 12 is a block diagram showing hardware for generating PAGE SYNC and LINE SYNC signals.
Figure 13:
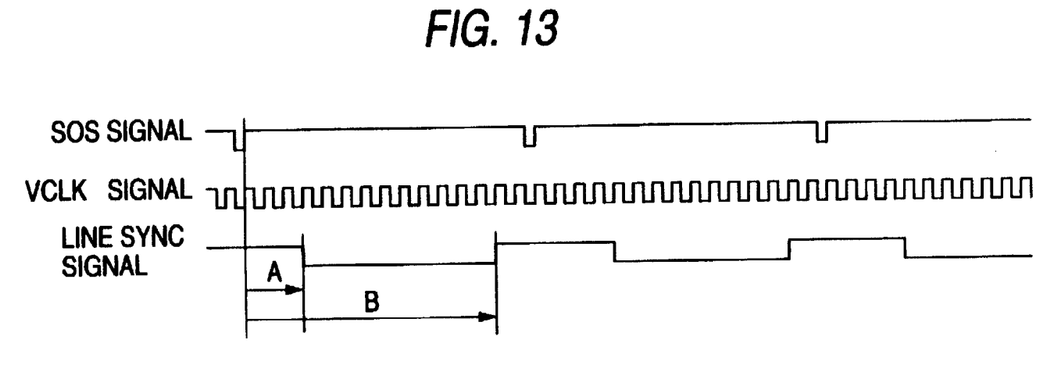
FIG. 13 is a time chart showing a signal for use in write timing control in the FS direction of ROS.

FIG. 12 is a block diagram illustrating hardware configuration for generating PAGE SYNC and LINE SYNC signals. A LINE SYNC counter circuit counts VCLK signal outputs from a video clock generating circuit by means of a preset counter value with an SOS signal from an SOS sensor for detecting the writing of one line to the photosensitive drum as a reference and has the LINE SYNC signal generated. More specifically, as shown in FIG. 13, the VCLK signals are counted to A with the SOS signal as a reference to let the LINE SYNC signal fall, whereas the VCLK signals are counted to B to let the LINE SYNC signal rise so as to generate the LINE SUNC signal. Incidentally, the counted values of A and B are rewritable by the CPU.

Figure 14:
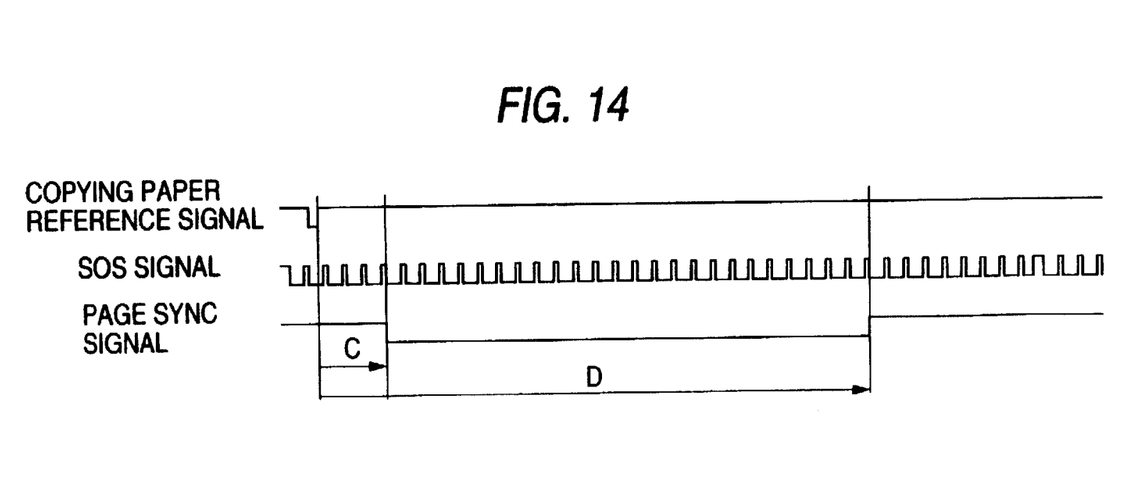
FIG. 14 is a time chart showing a signal for use in write timing control in the SS direction of ROS.

A PAGE SYNC counter circuit counts the SOS signals by means of a preset counter value with a signal at the time copying paper is sent from a registration position to the photosensitive drum as a reference, that is, the signal (a copying paper reference signal) generated in synchronization with a registration roll driving signal and the ON (opening operation) signal of a registration gate and has the PAGE SYNC signal generated. More specifically, as shown in FIG. 14, the copying paper reference signals are counted to C to let the PAGE SYNC signal fall, whereas the SOS signals are counted to B to let the PAGE SYNC signal rise so as to generate the PAGE SUNC signal.

The LD driving signal circuit outputs image data of one line and an LD driving signal. On the other hand, the LD driving signal is supplied to the laser emission unit while the PAGE SYNC signal is active, that is, during the time it falls until it rises, so that the laser is lit. The laser emission unit LDD outputs laser light corresponding to the image data. The laser light is reflected from a rotating polygon mirror and used for exposing purposes to form the electrostatic latent image on the photosensitive drum according to the image data.

FIG. 15 is a diagram explanatory of a process of writing an original image smaller than copying paper to an electrostatic latent image area (shown by a dotted line) equivalent to the copying paper. In this case, the copying paper fails to conform to the dotted line area when a copying paper skew occurs and this results in loss of part of the original image because a copy is output in such a state that there is no margin among the front edge of the copying paper, the side edge thereof and the image.

Figure 16:
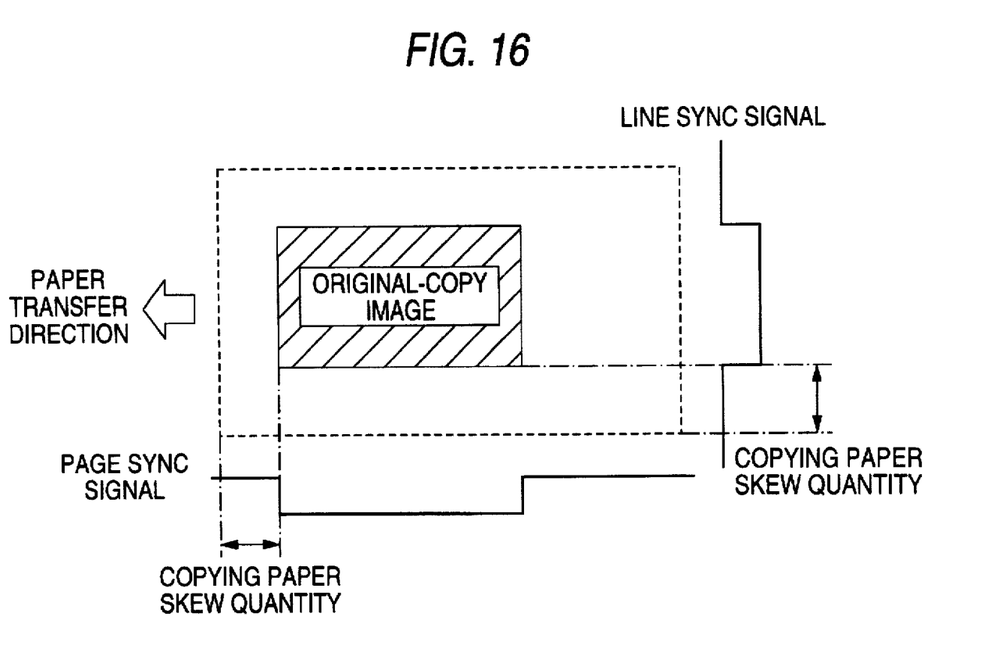
FIG. 16 is a diagram explanatorily showing a case where the image write position is changed by a copying paper skew quantity according to another embodiment of the invention.

The above problem is solved according to this embodiment of the invention as shown in FIG. 16 by changing the timing at which the electrostatic latent image is formed to the directions of FS and SS. The processing procedure is as follows: First, the overall original-copy recording function button is selected, so that the original-copy size is detected by scanning the original copy using the scanner. In the presence of an original-copy skew, a square area including the skew area is regarded as an original copy. Subsequently, selection is made of a copying paper whose size is greater than a combination of the detected original-copy size and the copying paper skew, and the original image is stored in the memory. Then the original image is written by shifting the timing of the PAGE and LINE SYNC signals inward by the copying paper skew quantity, and the electrostatic latent image of the original image is caused to be formed in a position corresponding to the inside of the selected copying paper. Then toner is used to develop the electrostatic image, which is transferred to the copying paper and fixed, whereby the image is recorded on the copying paper.

The method of shifting the write position on the screen inward according to this embodiment of the invention is to start the writing of the original image by shifting the write position of the laser write unit (ROS) by the copying paper skew quantity inward. However, the same effect is achievable by shifting the original-image write address from the leading address of the free memory secured beforehand by the copying paper skew quantity on the basis of the original-copy skew quantity and the copying paper skew quantity. In this case, the ROS timing control is effect so that it is started with the leading address.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus, comprising:

original-copy reading means for producing image data corresponding to an original image;

original-copy size detecting means for detecting a size of an original copy according to the image data;

copying paper selecting means for selecting a transfer paper, which is greater in size than the original-copy, based on a combination of the original-copy size detected by said original-copy detecting means and a copying paper skew quantity;

copying paper supply means for supplying the copying paper selected by said copying paper selecting means; and image-write-position control means for controlling an image-write timing according to the copying paper fed from said copying paper supply means.

2. An image forming apparatus as claimed in claim 1, further comprising means for designating the operation of recording an overall original-copy.

3. An image forming apparatus as claimed in claim 1, wherein said original-copy size detecting means detects the original-copy size as the size of a rectangular which is internally touched by the skewed original copy in a case where an original-copy skew exists.

4. An image forming apparatus as claimed in claim 1, wherein the image-write-position control means causes an image to be written from a position on the inner side of the leading end portion of the copying paper fed from said copying paper supply means by at least what is equivalent to the copying paper skew quantity.

5. An image forming apparatus as claimed in claim 1, further comprising:

a memory for storing the image data;

means for securing a free storage capacity in said memory on the basis of the original-copy size detected by said original-copy detecting means and the size of the transfer paper selected by said copying paper selecting means; and control means for controlling the preparation of an address for use in writing the image data to said memory according to the copying paper skew quantity, and the operation of writing the image data to said memory secured.

* * * * *